J. WORDEN.
Axle Lubricator.
No. 81,858.  Patented Sept. 1, 1868.
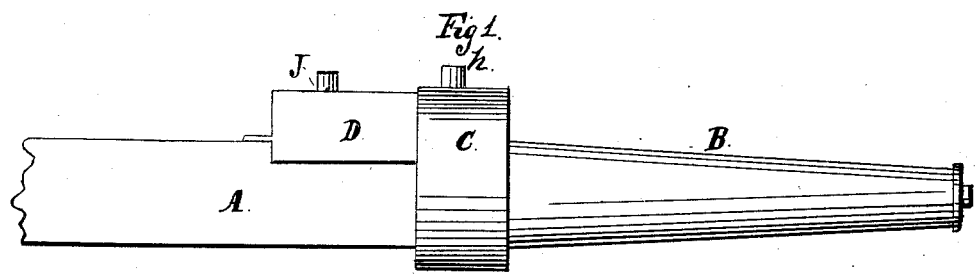
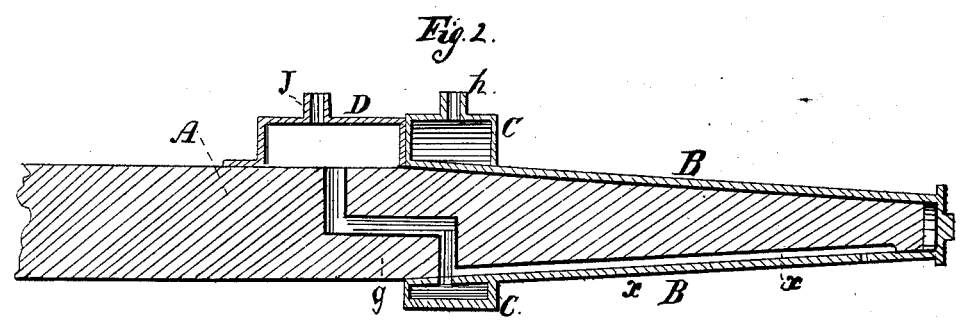

United States Patent Office.

JOHN WORDEN, OF NORMAL, ILLINOIS.

Letters Patent No. 81,858, dated September 1, 1868.

IMPROVEMENT IN LUBRICATOR FOR AXLES.

*The Schedule referred to in these Letters Patent and making part of the same.*

TO ALL WHOM IT MAY CONCERN:

Be it known that I, JOHN WORDEN, of Normal, in the county of McLean, and in the State of Illinois, have invented certain new and useful Improvements in Lubricators for Axles; and do hereby declare that the following is a full, clear, and exact description thereof, reference being had to the accompanying drawings, and the letters of reference marked thereon.

In the annexed drawings, making a part of this specification—

A represents an ordinary wooden axle, and

B represents the thimble-skein secured to the arm thereof, as shown. The under side of the arm of the axle A is provided with a groove, $x$, for purposes hereinafter described.

C represents a reservoir or tank for oil or grease, made in one piece with the skein B or the axle A, as may be found most convenient or desirable.

The tank C extends around and embraces the axle, and has a hole leading out into the groove $x$, by which the grease or oil is conveyed or runs to the extremity of the axle, and the skein B being provided with perforations leading from the groove $x$, the oil is continually flowing out to the bearing part of the axle when in use, and when at rest the weight keeps the axle steady down on its bearing, and thereby closes the holes or stops the flow therefrom, and thereby prevents any waste of oil.

The tank D has a pipe or hole, $g$, leading from it to the groove $x$, as shown. Suitable openings, $h$ and $j$, are made in the top of the tanks, by or through which they may be filled with oil. These holes may be closed by means of a cork or stopper, as desired.

A tank or oil-reservoir may be attached to an iron or any axle in a similar manner to that above described.

Having thus fully described my invention, what I claim as new, and desire to secure by Letters Patent, is—

The circumferential reservoir C, connected with the perforated skein B and the axle A, with its longitudinal groove $x$, to operate substantially as specified.

In testimony that I claim the foregoing, I have hereunto set my hand, this 26th day of February, 1868.

JOHN WORDEN.

Witnesses:
WM. WARE,
E. D. HARRIS.